Figure 1:
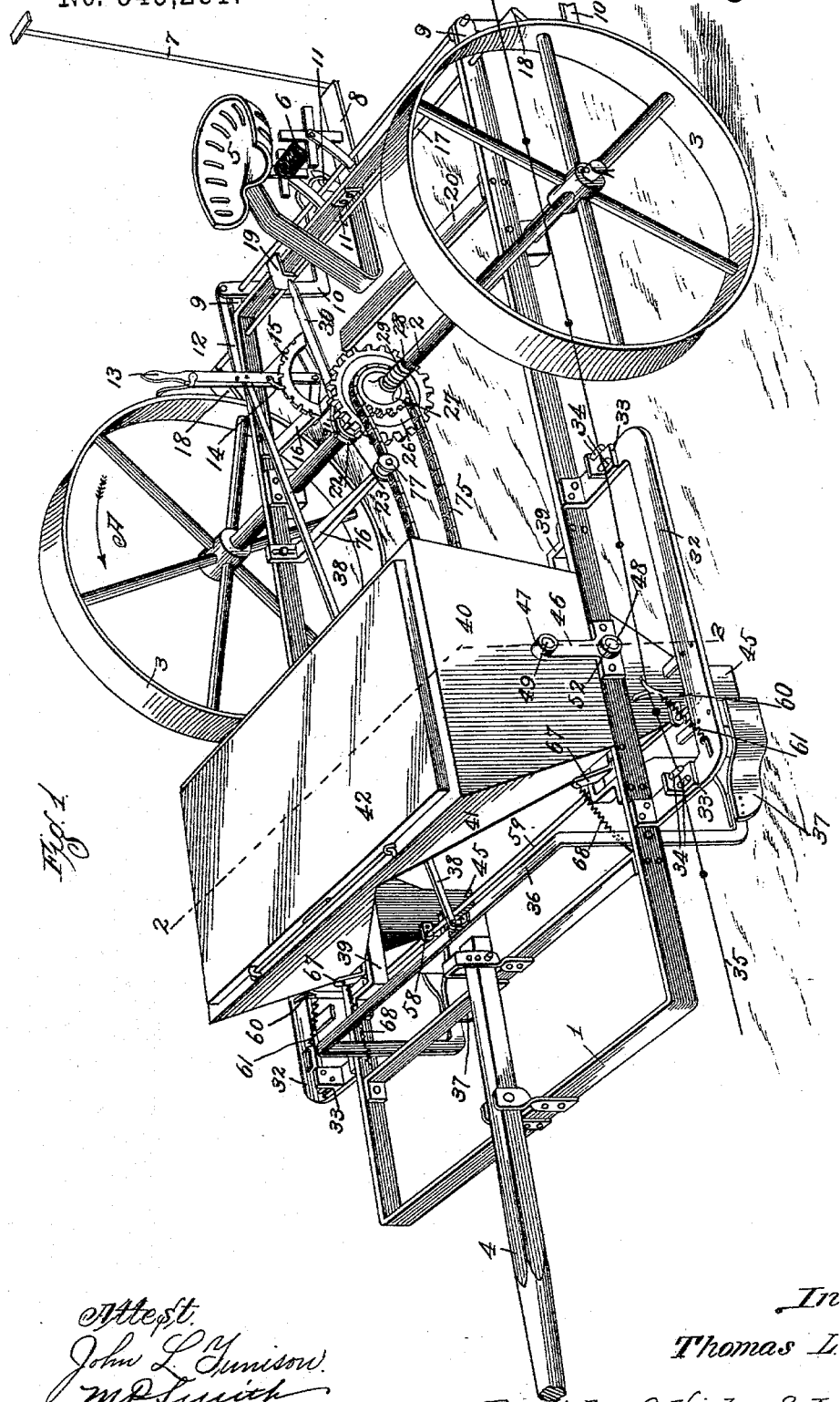

(No Model.) 2 Sheets—Sheet 1.

T. L. GOOD.
POTATO PLANTER.

No. 545,281. Patented Aug. 27, 1895.

Attest:
John L. Junison
M. P. Smith

Inventor:
Thomas L. Good.
By Higdon & Higdon & Longan, Attys

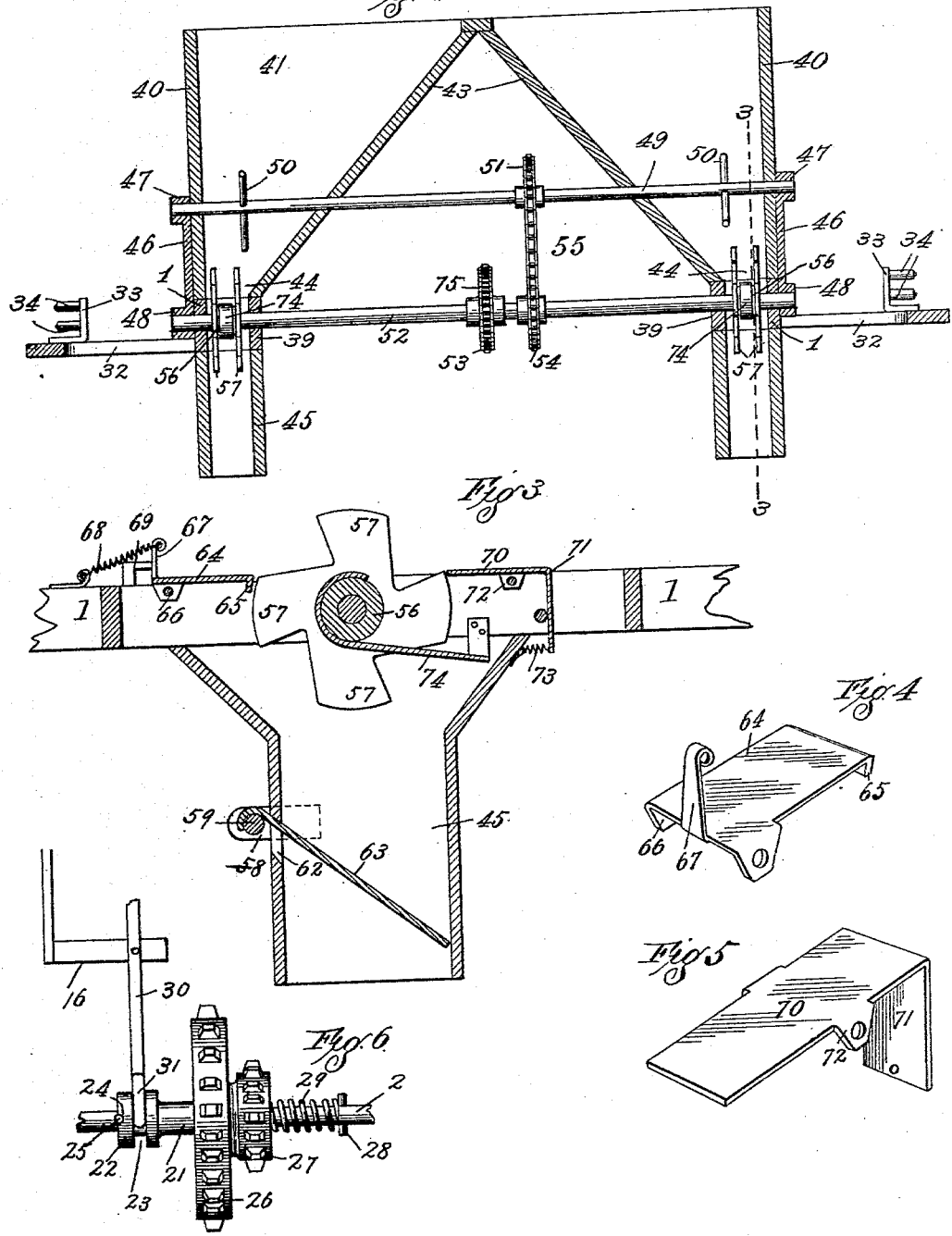

UNITED STATES PATENT OFFICE.

THOMAS LELAND GOOD, OF EDWARDSVILLE, ILLINOIS, ASSIGNOR OF ONE-HALF TO WILLIAM J. GOOD, OF ST. LOUIS, MISSOURI.

POTATO-PLANTER.

SPECIFICATION forming part of Letters Patent No. 545,281, dated August 27, 1895.

Application filed January 7, 1895. Serial No. 534,086. (No model.)

*To all whom it may concern:*

Be it known that I, THOMAS LELAND GOOD, of the city of Edwardsville, Madison county, State of Illinois, have invented certain new and useful Improvements in Potato-Planters, of which the following is a full, clear, and exact description, reference being had to the accompanying drawings, forming a part hereof.

My invention relates to a potato-planter, and is an improvement upon the potato-planter a patent for which was granted to me April 10, 1894, No. 518,141.

The object of my invention is to construct an improved potato-planter that will plant two rows of potatoes at a time through the medium of check-row mechanism.

A further object of my invention is to provide an improved two-row check-planter with the improved force-feed dropping mechanism, whereby fresh hand-cut seed-potatoes will be positively fed and planted regardless of their propensity to adhere to the contiguous parts of the mechanism.

A further object of my invention is to construct an improved potato-planter that is simple in construction and operation and efficient in use.

In the drawings, Figure 1 is a view in perspective of a planter constructed in accordance with my invention. Fig. 2 is a vertical cross-sectional view taken approximately on the indicated line 2 2 of Fig. 1. Figs. 3 is a vertical sectional view taken approximately on the indicated line 3 3 of Fig. 2. Figs. 4 and 5 are views in perspective of oscillating fingers I make use of in carrying out my invention. Fig. 6 is an elevation of a clutch mechanism used upon one of the transversely-positioned shafts of the planter.

Referring by numerals to the accompanying drawings, 1 indicates a rectangular frame, the same being preferably constructed of metal and having a shaft 2 journaled transversely near its rear end, upon the ends of which shaft 2 and outside the frame 1 are journaled ordinary traction-wheels 3. An ordinary tongue 4 is positioned in any suitable manner to the front end of the frame 1. A driver's seat 5 is mounted upon the rear end of the frame 1, and immediately beneath said driver's seat is a spool 6, upon which is adapted to be wound the check-row wire. A marker 7 is pivoted to an arm 8, that extends from the rear end of the frame 1, the function of which is well known and the description unnecessary.

Extending horizontally from the rear end corners of the frame 1 are plates 9, to which are pivoted the upper ends of right-angled arms 10, on the rear ends of which are fixed in any suitable manner furrow-covering shovels 11. One of the right-angled arms 10 extends slightly above the pivot-point and has fixed to said upper end one end of a connecting-bar 12, that is pivoted to a hand-lever 13, that is provided with a latch 14, that is adapted to engage in a toothed segment 15, the same being fixed to an arm 16, that extends inwardly from one side of the frame 1.

Transversely positioned in the rear end of the frame 1 is a rod 17, on the ends of which are fixed scrapers 18, that are adapted at times to engage the peripheries of the traction-wheels 3. A foot-lever 19 is formed integral with the rod 17 adjacent the driver's seat 5. A bar 20 is bolted to one side of the frame 1 and extends to the center of said frame, directly in front of the driver's seat 5, and is designed for a foot-rest for said driver. Adapted to move longitudinally upon the shaft or axle 2 is a sleeve 21, that is provided at one end with an enlarged portion or collar 22, in which is a peripheral groove 23. In the end or face of this enlargement is a semicircular notch 24, that is adapted to be normally engaged by a pin 25, fixed to the shaft or axle 2. Formed integral with the other end of this sleeve 21 is a sprocket-wheel 26, and to said sprocket-wheel 26 is rigidly fixed a smaller sprocket-wheel 27. A pin 28 is passed through the shaft or axle 2, and a coiled spring 29 is interposed between said pin and the smaller sprocket-wheel 27. This coil-spring 29, being of the expansive form, tends to cause the semicircular notch 24 to be engaged by the pin 25. A hand-lever 30 is fulcrumed at its center to the bar 16, and has its forward end forked, as indicated by 31, so as to engage in the peripheral groove 23 in the enlargement 22 of the sleeve 21. The rear end of this hand-lever is in juxtaposition to the driver's seat 5. Bolted to the sides of the frame 1, near the forward ends thereof, and extending in horizontal planes are rectangular metallic bars 32, upon which and in alignment with one another are bolted angle-blocks 33, upon the upright portions of which are pairs of antifriction-rollers 34, through which is adapted to pass the check-row wire 35. An inverted-U-shaped bar 36 is pivoted to the inside faces of the side portions of the frame 1, near the forward end thereof, and has rigidly fixed to its lower ends furrow-plows 37, the same extending in horizontal planes rearwardly from the lower ends of the pivoted bar 36. A rod 38 is pivoted to the center of the bar 36 at its forward end, and at its rear end is pivoted to the hand-lever 13, previously mentioned. Auxiliary frames 39, comprising rectangularly-bent bars, are bolted to the inside faces of the side portions of the frame 1 and extend inwardly toward each other and in opposite directions to the bars 32. The hopper I make use of is really a double hopper, as the planter is designed to drop or plant two rows at a time. Said double hopper comprises the vertical end walls 40, slightly inclined front and rear walls 41, hinged cover 42, and inclined bottom walls 43. The mouths 44 of the double hopper thus formed rest directly upon the rectangularly-bent bars 39 and sides of the frame 1 and communicate with the space between said bars 39 and the frame 1.

45 indicate seed-chutes, the upper ends of which register with the mouths of the double hopper and the lower ends of which are directly in the rear of the furrow-forming shovels 37.

Bars 46, constructed with bearings 47 in their upper ends and bearings 48 at their lower ends, are bolted rigidly to the outer faces of the sides of the frame 1 and at points half-way between the front and rear walls of the double hopper. A shaft 49 passes transversely through the lower ends of the double hopper, its ends being mounted in the bearings 47 on the upper ends of the bars 46. Within the hoppers and upon this shaft 49 are fingers 50, that perform the function of agitators. Rigidly mounted upon the shaft 49, between the hoppers, is a sprocket-wheel 51.

Passing transversely through the side portions of the frame 1 and through the rectangularly-bent bars 39 is a shaft 52, the ends of which are mounted in the bearings 48 on the lower ends of the bars 46. Rigidly fixed upon this shaft 52 are a pair of sprocket-wheels 53 and 54, the sprocket-wheel 54 being in direct alignment with the sprocket-wheel 51 upon the shaft 49 and connected to said sprocket-wheel 51 by a sprocket-chain 55. Rigidly fixed upon the shaft 52 and operating between the side portions of the frame 1 and the rectangularly-bent bars 39 are hubs 56, constructed with integral double fingers 57, said fingers and hubs constituting the feed-disks of my invention.

Extending transversely of the frame 1, directly in front of the chutes 45, and operating in bearings 58, fixed to the sides of said chutes, is a shaft 59, the upper ends of which are turned vertically upward between the sides of the frame 1 and the rectangularly-bent bars 32 and have formed integral with said upper ends the forks 60, through which the check-row wire 35 passes. Said forks 60 are held forward by coiled springs 61, that are attached to said forks and to the rectangularly-bent bars 32.

Formed in the forward walls of the chutes 45 are horizontal slots 62. Formed on or fixed to the shaft 59 and passing through said horizontal slots 62 are inclined bottoms 63, that normally close the passages through the chutes 45.

Metallic fingers or plates 64 have their forward ends 65 bent downwardly and ears 66 at their rear ends bent downwardly, whereby they are pivoted between the side portions of the frame 1 and the rectangularly-bent bars 39 just beneath the forward portions of the mouths of the hoppers, said downwardly-turned forward ends 65 lying adjacent the path of travel of the outer ends of the fingers 57 of the feed-disks. Arms 67 are formed integral with and extend vertically from the rear ends of the fingers or plates 64 and are connected by the coil springs 68 to a portion of the frame 1. Stops 69 are located immediately in the rear of the vertical arms 67 and restrict the rearward movement of said plates or fingers.

Fingers or plates 70 have their rear ends 71 turned downwardly and are pivoted by means of integral ears 72 between the side portions of the frame 1 and the rectangularly-bent bars 39 just below the rear portions of the mouths of the hoppers. The forward ends of these fingers or plates lie adjacent the path of travel of the outer ends of the fingers 57 of the feed-disks. Said plates or fingers 70 are held in normal positions by suitable springs 73, the same being fixed to the rear ends of said fingers and to the frame 1. Plates 74 pass partially around the hubs 56 of the feed-disks, and from thence extend rearwardly and are fixed to the side portions of the frame 1 and the rectangularly-bent bars 39 to cut off the passage of any of the seed-potatoes through the mouths of the hoppers by a reverse movement of the feed-disks. A sprocket-chain 75 connects the sprocket-wheel 53 with either of the sprocket-wheels 26 or 27. By shifting said sprocket-chain 75 from one sprocket-wheel to another the feed of the planter is regulated. An arm 76 is bolted to the inside of the frame 1, and extends to a point directly in front of the sprocket-wheels 26 and 27, and has mounted for rotation upon its end an idle-wheel 77, the same being adapted to engage the sprocket-chain 75.

The operation is as follows: The check-row wire 35 is stretched across the field in the ordinary manner and placed between the rollers 34 and in the forks 60 on the upturned ends of the shaft 59. Seed-potatoes are placed in both divisions of the hopper and the cover closed. The furrow-forming plows 37 and the furrow-covering shovels 11 are lowered to engage with the surface of the ground by throwing the hand-lever 13 to a rearward position and locking the same by means of the latch 14, engaging in the teeth of the segment 15. The marker 7 is lowered to its usual position and operates in the ordinary manner. As the planter is moved forward the main shaft or axle 2 and parts mounted thereon will be rotated in the direction of the arrow A, Fig. 1, rotary movement will be imparted to the shaft 52 by means of the sprocket-chain 75, extending from one of the sprocket-wheels 26 or 27 to the sprocket-wheel 53, and rotary motion will be imparted to the shaft 49 by means of the sprocket-chain 55, passing over the sprocket-wheels 54 and 51. The agitating-pins 50 upon the shaft 49 and within the hoppers will stir the seed-potatoes within said hoppers and cause the same to be engaged by the fingers 57 of the feed-disks, the same rotating with the shaft 52. As said seed-potatoes are engaged by the fingers of the feed-disks they will be carried thereby past the pivoted plates or fingers 64 and dropped onto the inclined movable bottoms 63 of the chutes 45. When the buttons on the check-row wire 35 engage the fork 60, they will draw the same rearwardly, partially rotate the shaft 59, and lower the inclined bottom 63, and thus allow the seed-potatoes to drop into the furrows made by the furrow-plows, where they are immediately thereafter covered by the covering-shovels 11. The springs 61 will cause the forks 60, shaft 59, and inclined bottom 63 to instantly reassume their normal positions until the fork is engaged by the next button. Should a seed-potato project beyond the fingers 57 of the feed-disks, it will be carried forward by said fingers, as the spring 68 will expand or stretch and allow the forward downturned end 65 of the plate 64 to move downwardly. When the end of the field is reached or it is desired to stop the dropping mechanism, the operator throws the hand-lever 30 slightly to one side, which will disengage the semicircular notch 24 from the pin 25 and allow the main axle or shaft 2 to rotate and not affect the sleeve 21 and integral parts. When the dropping mechanism is not at work and the planter is being moved from one point to another, the hand-lever 13 is moved forward, which necessarily raises the furrow-plows 37 and the furrow-covering shovels 11 away from the ground. To clean the traction-wheels 3 the operator merely places his foot upon the plate 19, which necessarily causes the scrapers 18 to engage the peripheries of said traction-wheels. Thus it will be seen how I have constructed an improved potato-planter, the same possessing superior advantages in point of simplicity, durability, and general efficiency.

What I claim is—

1. In a potato planter, a double mouthed hopper mounted upon the forward end of the planter, shafts mounted for rotation and positioned transversely through said hopper, force feed disks mounted upon the lowermost shaft, agitating pins mounted upon the upper shaft, oscillating spring-actuated fingers or plates mounted on each side of the force feed disks, and suitable driving mechanism for the shafts.

2. In a potato planter, a frame, an axle, supporting-wheels, a double-mouthed hopper mounted near the forward end of said planter, force-feed mechanism in said hopper, sprocket-gearing connecting said force-feed mechanism to said axle, dropping-chutes vertically-arranged beneath the mouths of said hoppers, a check-row mechanism and its wire, and inclined tilting bottoms for said chutes, the same being tilted or operated by the check row wire.

3. The combination of a frame, supporting-wheels, a double-mouthed hopper mounted on the forward portion of said frame, chutes vertically-arranged beneath the mouths of said hopper, covering shovels pivotally connected to the rear portion of said frame, a U-shaped bar 36 pivoted to the side portions of said frame so that its upper portion projects in a plane above said frame, a hand-lever 13, connections between said hand-lever and said covering shovels, a rod 38 pivoted to the center of said U-shaped bar and connected to said hand-lever, and furrow plows 37 the forward ends of which are rigidly connected to the depending ends of said U-shaped bar 36, whereby when the upper portion of said U-shaped bar is thrown forward said furrow-plows will be elevated and said covering shovels will be simultaneously elevated, substantially as herein specified.

4. In a potato planter, the force-feed disk-hubs 56 constructed each with a series of radial fingers 57 in pairs, so that a space is formed between the fingers which compose each pair and another space is formed between the adjacent edges of each pair, the peripheries of said fingers being curved to conform to the radius of a circle common to all of said fingers, in combination with a shaft on which said hubs are mounted, suitable driving-mechanism, and spring-plates 74 passed partly around said hubs and thence extended rearwardly and fixed to the frame of the machine, substantially as herein specified.

In testimony whereof I affix my signature in presence of two witnesses.

THOMAS LELAND GOOD.

Witnesses:
 EDWARD E. LONGAN,
 O. J. COMER.